US011165841B2

(12) United States Patent
Lahore-Carraté et al.

(10) Patent No.: US 11,165,841 B2
(45) Date of Patent: Nov. 2, 2021

(54) METHOD FOR TRANSMITTING CONTENT TO MOBILE USER DEVICES

(71) Applicant: EXPWAY, Paris (FR)

(72) Inventors: Romain Lahore-Carraté, Rosny sous Bois (FR); Tuan Tran Thai, Paris (FR); Christophe Burdinat, Villeurbanne (FR); Cédric Thienot, Paris (FR)

(73) Assignee: EXPWAY, Paris (FR)

( * ) Notice: Subject to any disclaimer, the term of this patent is extended or adjusted under 35 U.S.C. 154(b) by 0 days.

(21) Appl. No.: 16/343,014

(22) PCT Filed: Oct. 18, 2017

(86) PCT No.: PCT/EP2017/076633
§ 371 (c)(1),
(2) Date: Apr. 18, 2019

(87) PCT Pub. No.: WO2018/073317
PCT Pub. Date: Apr. 26, 2018

(65) Prior Publication Data
US 2019/0273769 A1   Sep. 5, 2019

Related U.S. Application Data

(60) Provisional application No. 62/409,653, filed on Oct. 18, 2016.

(51) Int. Cl.
*G06F 15/16* (2006.01)
*H04L 29/06* (2006.01)
(Continued)

(52) U.S. Cl.
CPC ...... *H04L 65/4084* (2013.01); *H04L 12/1881* (2013.01); *H04L 65/4076* (2013.01);
(Continued)

(58) Field of Classification Search
CPC ............ H04L 65/4084; H04L 12/1881; H04L 65/4076; H04L 65/80; H04L 67/02; H04L 67/06
See application file for complete search history.

(56) References Cited

U.S. PATENT DOCUMENTS 6,813,690 B1 * 11/2004 Lango ................ G06F 12/0866
707/999.103
6,980,311 B1 * 12/2005 Currans ............... G06F 16/9566
358/1.15
(Continued)

FOREIGN PATENT DOCUMENTS

EP          3021554 A1    5/2016

OTHER PUBLICATIONS

Jan. 30, 2018 International Search Report issued in International Patent Application No. PCT/EP2017/076633.
(Continued)

*Primary Examiner* — Padma Mundur
(74) *Attorney, Agent, or Firm* — Oliff PLC

(57) ABSTRACT

A method for accessing a service delivering content from a user terminal includes: transmitting a Uniform Resource Locator to a client module of the terminal, the URL including an identifier of a requested content and a command specifying a request or condition related to delivery to the user terminal of the requested content, if the requested content is available in the user terminal according to the specified condition, receiving the requested content from the client module, and if the requested content is not available in the user terminal according to the specified condition, transmitting the URL to a service broadcasting server.

17 Claims, 3 Drawing Sheets

(51) Int. Cl.
　　　*H04L 12/18*　　　(2006.01)
　　　*H04L 29/08*　　　(2006.01)
(52) U.S. Cl.
　　　CPC .............. *H04L 65/80* (2013.01); *H04L 67/02*
　　　　　　　　(2013.01); *H04L 67/06* (2013.01)

(56) References Cited

U.S. PATENT DOCUMENTS

| | | | |
|---|---|---|---|
| 8,332,469 B1* | 12/2012 | Appleton | G06F 16/9566 |
| | | | 709/203 |
| 2012/0191804 A1* | 7/2012 | Wright | G06F 16/9574 |
| | | | 709/217 |
| 2012/0259946 A1* | 10/2012 | Stockhammer | H04N 21/8456 |
| | | | 709/217 |
| 2013/0111520 A1 | 5/2013 | Lo et al. | |
| 2014/0201335 A1* | 7/2014 | Wang | H04L 65/80 |
| | | | 709/219 |
| 2014/0215532 A1* | 7/2014 | Schmidt | H04N 21/2668 |
| | | | 725/74 |
| 2014/0229529 A1 | 8/2014 | Barone et al. | |
| 2017/0374417 A1* | 12/2017 | Hernandez-Mondragon | ............... |
| | | | H04N 21/4312 |

OTHER PUBLICATIONS

Jan. 30, 2018 Written Opinion issued in International Patent Application No. PCT/EP2017/076633.

\* cited by examiner

METHOD FOR TRANSMITTING CONTENT TO MOBILE USER DEVICES

TECHNICAL FIELD

Aspects of the present disclosure may relate to a method and device for transmitting content of various formats to user devices through wireless communication networks.

BACKGROUND

Wireless communication networks are widely deployed to provide various communication services such as voice, video, packet data, messaging, broadcast, etc. These wireless networks are generally multiple-access networks capable of supporting multiple users by sharing the available network resources.

A wireless communication network may include a number of base stations that can support communication for a number of user devices also referred to as mobile entities. A user device may communicate with a base station via a downlink and an uplink. The downlink (or forward link) refers to the communication link from the base station to the user equipment, and the uplink (or reverse link) refers to the communication link from the user equipment to the base station.

The third Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations and mobile entities. In prior applications, a method for facilitating high bandwidth communication for multimedia has been single frequency network (SFN) operation for broadcast. SFNs utilize radio transmitters, such as, for example, those in base stations, to communicate with subscriber devices. In unicast operation, each base station is controlled so as to transmit signals carrying information directed to one or more particular subscriber device.

In broadcast operation, several base stations in a broadcast area may broadcast signals in a synchronized fashion, carrying information that can be received and accessed by any subscriber device in the broadcast area. The generality of broadcast operation enables greater efficiency than unicast service in transmitting information of general public interest, for example, event-related multimedia broadcasts. As the demand and system capability for event-related multimedia and other broadcast services has increased, system operators have shown increasing interest in making use of broadcast operation in 3GPP networks.

Transmission of content, such as video content, may be performed by various methods in communication networks. In the case of video content, for example, transmission of video information from a video source to a display can be made via unicast transmissions or multicast/broadcast transmissions. Unicast transmissions are directed to a specifically targeted receiving device. To obtain a unicast transmission, a target device may have a Uniform Resource Locator (URL) with the address of the video source, and may generate an HTTP (HyperText Transfer Protocol) GET command that it may send to the video source (typically a server) to facilitate download of the video file.

A known method for transmission of video in a unicast environment is through Dynamic Adaptive Streaming over HTTP (DASH). Use of DASH in unicast obtains the entire file. DASH may convert the video file into smaller components called DASH segments, which may be reassembled at the receiving device to display the desired video. Another method is HTTP Live Streaming (HLS), following the same mechanism as DASH.

Multicast or broadcast transmissions, such as in evolved-Multimedia Broadcast/Multicast Service (eMBMS), present different considerations, as the transmissions are sent to multiple receiving devices. In these environments, the receiving devices can obtain information before the associated system which actually takes steps to obtain that information. The receiving device may store that received information in a local cache. When the system (typically at the application layer) generates a URL to obtain the information, the generated URL may point to content already in the local cache rather than at the server side as in the unicast environment.

DASH in combination with File Delivery over Unidirectional Transport (FLUTE) may be used in multicast environments. According to such a combination, video content may be converted into DASH segments and small groups of DASH segments may be accumulated by a FLUTE package engine (FPE), which in turn may convert the DASH segments into FLUTE packets for transmission. The structure of the DASH segments conforms to the ISO Base Media File Format (ISOBMFF).

DASH, and most ISOBMFF-based adaptive streaming technologies, usually assumes an error-free transport layer. However, deployments such as eMBMS may rely on multicast User Datagram Protocol (UDP) or other broadcast data link layers such as DVB-GSE (Digital Video Broadcasting-Generic Stream Encapsulation) for the delivery of DASH segments.

Network available contents or services can be accessed using a MBMS scheme or a HTTP/HTTPS scheme. Traditionally, the user devices are configured to access a MBMS service using MBMS Application Programming Interface (API) in a direct way, and to query HTTP/HTTPS contents using HTTP/HTTPS URLs.

When a user device (an application installed in the user device) requests a content, the requested content may be already downloaded in the user device and locally stored in a cache memory, it can be delivered either in unicast or in multicast or broadcast, and it can be delivered at the time of the request transmission or delivery can be scheduled in the future. In addition, the specifications 3GPP TS 26.347 introduces a generic case where resources are rendered and queried by the client applications, using a generic operating system URL resolution library. Depending on a given scheme (e.g., mbms, http), an appropriate URL handler of the operating system is called to handle resource rendering. If the scheme name of an URL provided by a user application is http/https, the URL is provided to an HTTP URL handler. If the mbms scheme name is present in the URL, the URL is provided to a MBMS URL handler.

It may be desirable to exploit all specificities of MBMS and provide simplified and flexible content delivery services to user devices, taking into account, in particular, that a content item can be already downloaded and cached in the user device, or can be delivered either in unicast or in multicast/broadcast. It may be also desirable to schedule content delivery in broadcast mode, especially when there is a high demand for a service. Therefore it is desirable to enable the user devices to get information about content delivery in multicast/broadcast mode and to define conditions to be applied to the content delivery.

SUMMARY

A method is described for accessing a service delivering content from a user terminal. The method includes: transmitting a Uniform Resource Locator (URL) to a client module of the terminal, the URL including an identifier of a requested content and a command specifying a request or condition related to delivery to the user terminal of the requested content, if the requested content is available in the user terminal according to the specified condition, receiving the requested content from the client module, and if the requested content is not available in the user terminal according to the specified condition, transmitting the URL to a service broadcasting server.

According to an embodiment, the method further comprises generating the URL by an application of the user terminal.

According to an embodiment, the URL include a scheme specifying as a service type a multimedia broadcast or multicast service or a hypertext transfer protocol service, the method further comprising transmitting the URL to an URL handler of the terminal specific to the scheme.

According to an embodiment, the specified condition is a scheduling or temporal condition related to access of the requested content, and/or a technical condition related the user terminal capabilities, and/or a user condition defined by the user related to the requested content.

According to an embodiment, the command specifies a request for a current status of the requested content delivery.

According to an embodiment, the command belongs to the command set comprising:

a command specifying a start time from which the requested content is requested, the start time being the present time if no time is specified, a command specifying a period during which the content is requested, a command specifying media codecs and a display size of the user terminal, a command specifying a location of the user terminal, a command specifying preferred languages for the requested content, a command specifying a content publication date from which the requested content is requested, commands specifying beginning and end of a requested part the requested content, a command for stopping or cancelling access to the requested content, a command for requesting a delivery status of the requested content, a command for specifying that the requested service content must be accessed in background by the terminal, a command for requesting to receive a notification when or indicating when the requested content is ready for being broadcasted, and a command for requesting a last version of the requested content available within a period starting from a time specified by the command specifying a start time and having a duration defined by the command specifying a period during which the content is requested.

According to an embodiment, the method further comprises receiving from the service broadcasting server, a notification that the requested content will be broadcasted at a specified date.

According to an embodiment, the method further comprises counting, by the service broadcasting server, a number of terminals requesting the content in a network area, and when the number of terminals requesting the content exceeds a threshold value, scheduling broadcasting of the content.

According to an embodiment, the method further comprises notifying to the terminals requesting the content, schedule data related to broadcasting of the requested content.

According to an embodiment, the URL comprises a service identifier of the service delivering the requested content and the content identifier, or only the content identifier, the method further comprising a domain name system resolution when the URL comprises only the content identifier.

Embodiments may also relate to a terminal configured to access a service delivering content, the terminal being further configured to implement the method as previously defined.

Embodiments may also relate to a computer program product loadable into a computer memory and comprising code portions which, when carried out by one or more computers, configure the one or more computers to carry out the method as previously defined.

BRIEF DESCRIPTION OF THE DRAWINGS

The method and/or device may be better understood with reference to the following drawings and description. Non-limiting and non-exhaustive descriptions are described with the following drawings. In the figures, like referenced signs may refer to like parts throughout the different figures unless otherwise specified.

DETAILED DESCRIPTION

Figure 1:
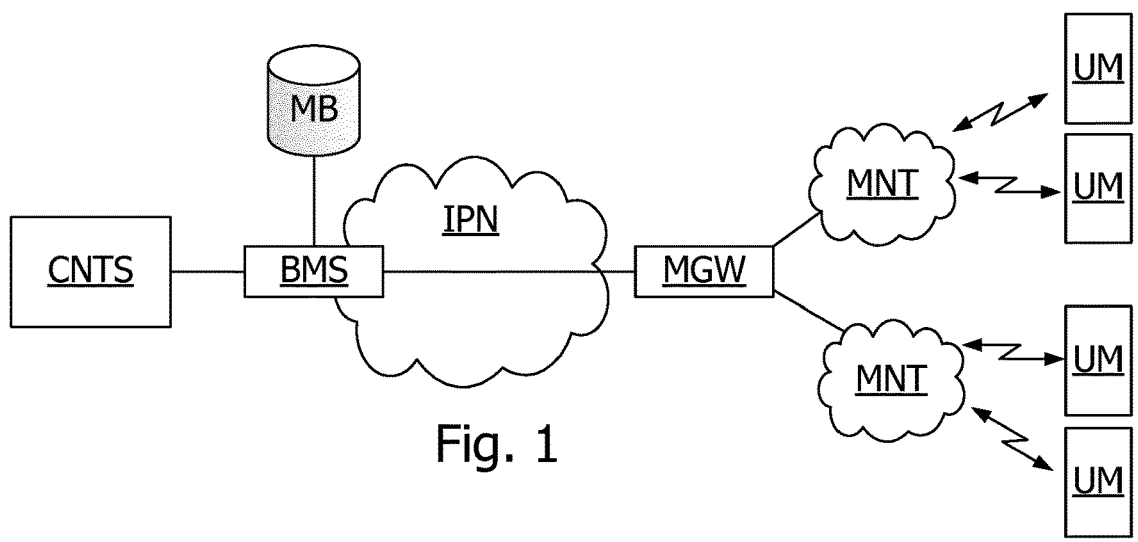
FIG. 1 is a block diagram of a system providing a multicast or broadcast service of media data over a network.

This disclosure concerns techniques related to streaming and file delivery services of multimedia data, such as audio and video data, over a network. These techniques, which may be used in conjunction with dynamic adaptive streaming over HTTP (DASH), include streaming video data, which has been encapsulated according to ISO Base Media File Format (ISOBMFF), using a multicast or broadcast protocol over a file delivery service, such as the File Delivery over Unidirectional Transport (FLUTE) protocol. FLUTE builds on the asynchronous layered coding (ALC) protocol, which provides reliable transport, and thus, FLUTE may also be referred to as FLUTE/ALC.

Additional file delivery protocols, which may be used in place of FLUTE, include FCAST, raw ALC/LCT (e.g., using ALC and LCT headers to deliver file attributes such a file type, encoding, and compression attributes, ROUTE and NORM. FCAST is described in Roca, "FCAST: Scalable Object Delivery for the ALC and NORM protocols," IETF RMT Working Group, October 2011. ALC is described in Luby et al., "Asynchronous Layered Coding (ALC) Protocol Instantiation," RFC 5775, April 2010. LCT is described in Luby et al, "Layered Coding Transport (LCT) Building Block," RFC 5651, October 2009. ROUTE is an evolution of FLUTE for ATSC 3.0, described in "Signalling, Delivery, Synchronization, and Error Protection (N331)". NORM is described in Adamson et al., "NACK-Oriented Reliable Multicast (NORM) Transport Protocol," RFC 5740, November 2009. Other protocols for large-scale file broadcast download include the IEEE 802.1E System Load Protocol which broadcasts files at the MAC layer. In IP-based mobile broadcast TV systems, such as DVB-H, ATSC-M/H, 3GPP MBMS (multimedia broadcast multicast services), 3GPP2 BCMCS (broadcast and multicast service), streaming and file delivery services are delivered using different transport protocols. Streaming services delivery employs RTP (Real-time Transport Protocol—in accordance with RFC 3550), or MMT (MPEG media transport, specified in ISO/IEC 23008-1), whereas file delivery services include FLUTE/ALC (in accordance with RFC 3926 and RFC 5775, respectively). Unicast-based adaptive HTTP streaming services are currently the dominant technology in the Internet for video delivery, and is being standardized in 3GPP [TS 26.247] and MPEG [ISO/IEC FCD 23001-6], generally referred to as DASH (Dynamic Adaptive Streaming over HTTP).

Broadcast streaming delivery may also utilize a file delivery service, such as the FLUTE protocol documented in RFC 6726. The file delivery service may operate over a broadcast media access control (MAC) protocol, such as enhanced Multimedia Broadcast Multicast Service (eMBMS), which is based on LTE technology, or a multicast protocol such as IP Multicast. Both streaming and file contents are carried by a single application transport protocol (e.g., FLUTE). Furthermore, by employing DASH as the continuous media "file" structure to carry streaming contents in FLUTE/ALC packets, service continuity from broadcast to unicast delivery simply involves a switch from transporting DASH segments over FLUTE/broadcast to HTTP/unicast.

FIG. 1 represents a system providing broadcast multicast streaming and/or file delivery services of multimedia data MBMS (Multimedia Broadcast Multicast Service). This system comprises one or more content servers CNTS, one or more networks IPN such as Internet, one or more servers MBMS implementing a MBMS or eMBMS service, linked to one of the servers CNTS via one of the network IPN, one or more gateways MGW between the server BMS and mobile networks UTRN, and user or client devices UM each connected to one of the mobile networks UTRN. One of the servers CNTS transmits multimedia content, for example according to MPEG-DASH.

File Delivery may concern services for downloading a single file or a set of files accessible from a common base URL, e.g. an HTML page of a web service.

Figure 2:
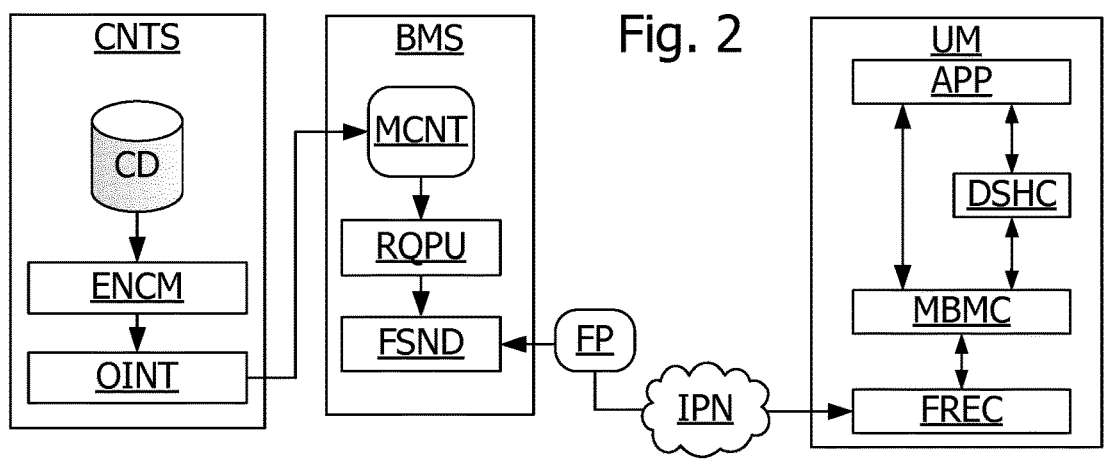
FIG. 2 is a block diagram of a more detailed view of the system of FIG. 1, FIG. 3 schematically illustrates software layers implemented in a mobile terminal to access unicast or broadcast content.

FIG. 2 is an exemplary detailed block diagram of the system of FIG. 1. In this example, the server CNTS produces and/or stores content data CD such as encoded video data, audio data, files, multimedia content, etc. More generally the server CNTS may produce data streams which may be converted into a packetized elementary stream before being encapsulated within a file. Each individual stream may be subjected to a compression processing according to a compression standard such as ITU-T H.261, H.262, H.263, MPEG-1, MPEG-2, H.264/MPEG-4 part 10.

In the example of FIG. 2, the server CNTS comprises an encapsulation unit ENCM which receives elementary streams comprising encoded data. The encapsulation unit ENCM forms corresponding network abstraction layer units from the elementary streams. The encapsulation unit ENCM may provide data for one or more representations of multimedia content, along with a manifest file (e.g., the MPD) to an output interface OINT. The output interface OINT may comprise a network interface or an interface for writing to a storage medium, such as a universal serial bus (USB) interface, a CD or DVD writer or burner, an interface to magnetic or flash storage media, or other interfaces for storing or transmitting media data. The encapsulation unit ENCM may provide data of each of the representations of a corresponding multimedia content to the output interface OINT, which may send the data to server BMS via network transmission or storage media.

The server BMS may implement one or more broadcast or multicast protocols to broadcast or multicast multimedia data. In the example of FIG. 2, the server BMS may include a storage medium that stores various multimedia contents MCNT, a request processing unit RQPU and a network interface FSND. In some examples, the server BMS may include a plurality of network interfaces, including the network interface FSND. Furthermore, any or all of the features of server device MBMS may be implemented on other devices of a content distribution network, such as routers, bridges, proxy devices, switches, or other devices. In some examples, intermediate devices of a content distribution network may cache data of multimedia content MCNT, and include components that conform substantially to those of the server BMS. In general, the network interface FSND is configured to send and receive data via the network IPN.

In the example of DASH, there may be multiple representations for a multimedia content. The manifest of such representations is defined in a Media Presentation Description MPD data structure. A media presentation may correspond to a structured collection of data that is accessible to an HTTP streaming client device. The HTTP streaming client device may request and download media data information to present a streaming service to a user of the client device. The MPD data structure describes coding and rendering characteristics of each representation. In addition, a server device may provide data that describes characteristics of a broadcast or a multicast, e.g., to provide sufficient information for a client device to receive the broadcast or multicast. For example, the data may include a multicast address that client devices may use to join the multicast content delivery.

The multimedia contents MCNT may include a manifest file and one or more representations. In some examples, representations may be separated into adaptation sets. That is, various subsets of representations may include respective common sets of characteristics. The manifest file may include data indicative of the subsets of representations corresponding to particular adaptation sets, as well as common characteristics for the adaptation sets. The manifest file may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file.

The request processing unit RQPU is configured to receive network requests from client devices UM, for data content MNCT. For example, the request processing unit RQPU may implement hypertext transfer protocol (HTTP) version 1.1 or 2 (version 1.1 is described in RFC 2616, version 2 is described in RFC 7540). That is, the request processing unit RQPU may be configured to receive HTTP GET or partial GET requests and provide data of multimedia content MCNT in response to the requests. The requests may specify a segment of one of representations, e.g., using a URL of the segment. In some examples, the requests may also specify one or more byte ranges of the segment. In some examples, byte ranges of a segment may be specified using partial GET requests.

The request processing unit RQPU may further be configured to service HTTP HEAD requests to provide header data of a segment of one of representations. In any case, the request processing unit RQPU may be configured to process the requests to provide requested data to a requesting device, such as client device UM.

The network interface FSND may be configured to receive the DASH segments from the request processing unit RQPU, and convert them into FLUTE packets FP. The network interface FSND may fragment a DASH segment over one or more FLUTE packets. The conversion into FLUTE packets FP involves a FEC (forward error correction) encoding to encode the DASH segments with redundant data enabling transmission error correction. In order to correlate the FLUTE packets FP with the DASH segments, the network interface FSND may assign one Transmission Object Identifier (TOI) for each segment. One segment may be considered as one file, and the segment URL can be the same as the file name of a FLUTE file identified by the TOI. The network interface FSND may generate a File Delivery Table (FDT) instance to describe attributes for those DASH segments. Attributes of DASH segments may include a file name (specified by, e.g., a URL), a file type (e.g., MIME media type of the file), a size of the file, a message digest of the file (e.g. MD5), information relative to FEC processing, and an encoding format of the file. The table FDT may transmitted in one or more of the FLUTE packets FP sent by the network interface FSND.

The client device UM may comprise a file receiver FREC, an application APP, and a MBMS client module MBMC. The application APP may include software for exploiting content received from the server BMS, including for example content decoders and players such as audio and video decoders and players. The file receiver may comprise a FLUTE receiver and a FEC decoder, to implement a file delivery protocol, such as the FLUTE protocol. In this manner, the client device UM may be configured to retrieve data of the multimedia content MCNT using broadcast or multicast via the FLUTE protocol. To utilize FLUTE as a file delivery service, the server BMS may insert in the File Delivery Table (FDT) attributes indicating one or more unicast uniform resource locators (URLs) for the media content MCNT to the client device UM. The file receiver FREC may receive data, whether by broadcast, multicast, or unicast, sent from the server device MBMS (or another server device). In particular, the file receiver FREC may receive FLUTE packets and provide data of received segments of representations to the application APP. The application APP may in turn provide the DASH segments to a DASH client module DSHC which communicates through a DASH server module with the MBMS client module MBMC. The module MBMS implements functionalities defined in the specifications 3GPP TS 26.346.

The application APP may comprise a web browser executed by a hardware-based processing unit of the client device UM, or a plug-in to such a web browser. References to the application APP should generally be understood to include either a web application, such as a web browser, a standalone video player, or a web browser incorporating a playback plug-in to the web browser. In the case of video content, the application APP may retrieve configuration data within the client device UM to determine decoding capabilities of audio and video decoders and rendering capabilities of the audio and video players.

The application APP may be configured to request and receive broadcast or multicast data sent by the server BMS. For example, the application APP may be configured to initially retrieve data for a manifest file, which may include data for joining a multicast group (such as a multicast group IP address) or for receiving a broadcast (e.g., data for joining a broadcast domain or VLAN).

At times, a user of the client device UM may interact with the application APP using user interfaces of the client device UM, such as a keyboard, mouse, stylus, touchscreen interface, buttons, or other interfaces, to request multimedia content, such as the multimedia content MCNT. In response to such requests from a user, the application APP may select one of representations based on, e.g., decoding and rendering capabilities of the client device UM. To retrieve data of the selected one of representations, the application APP may sequentially request specific byte ranges of the selected one of representations. In this manner, rather than receiving a full file through one request, the application APP may sequentially receive portions of a file through multiple requests.

Figure 3:
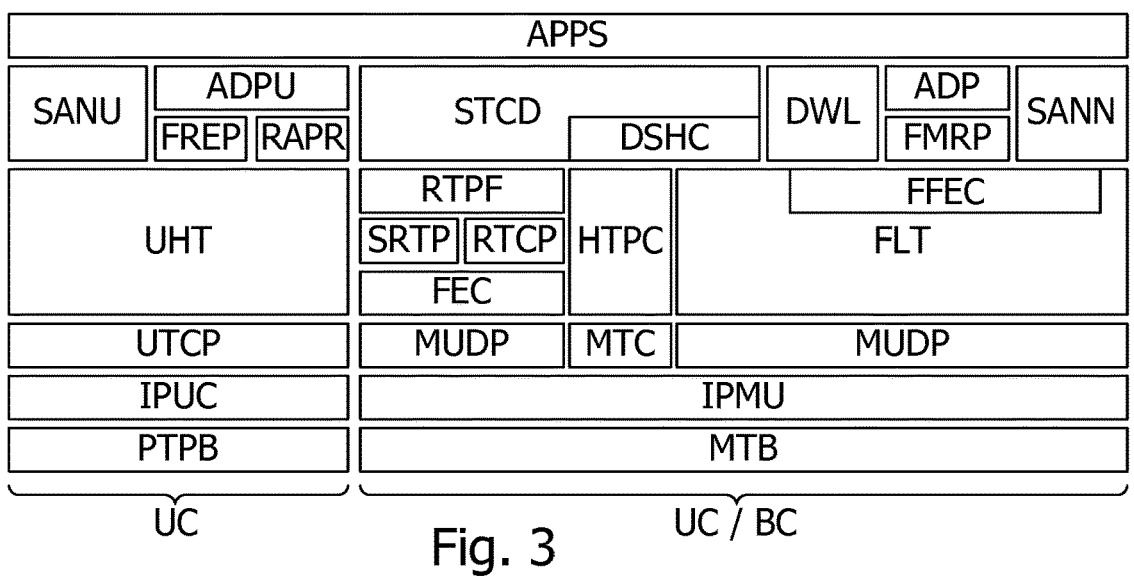

FIG. 3 illustrates software layers implemented in a mobile terminal to access unicast or broadcast content. These software layers correspond to the network layer as specified in the OSI (Open System Interconnection) model. These software layers include an applicative layer APPS including all the applications installed in the mobile terminal, these applications using service and content reception layers. The service and content reception layers are of two different types to receive contents either exclusively in unicast mode UC, or in MBMS mode implementing the unicast and multicast/broadcast modes UC/BC. The service and content reception layers further comprise elements related to security which are not apparent in FIG. 3.

Starting from the highest level under the applicative layer APPS, the software layers related to the unicast mode UC comprise, in parallel, an announcement service SANU providing metadata related to contents provided by content services, associated delivery procedures ADPU, including in particular a file repair service FREP for processor transmission errors, and a reception reporting service RAPR providing statistical data related to data reception. These statistical data can be transmitted to the server BMS, for example. The data provided by the layers SANU and ADPU are transmitted by an HTTP layer UHT implementing the protocol HTTP (HyperText Transfer Protocol). The data transmitted by the layer UHT are encapsulated and transmitted by a transport layer UTCP implementing the protocol TCP (Transmission Control Protocol). The data transmitted by the layer UTCP are inserted into packets by a network layer IPUC implementing the protocol IP (Internet Protocol). Lastly, a point to point link layer PTPB corresponding to the implementation of a radio transmission channel, transmits the packets IP produced by the layer IPUC.

Starting from the highest level under the applicative layer APPS, the software layers related to the MBMS (UC/BC) mode comprise, in parallel, an announcement service SANN for announcing the available data streams, in particular multicast- or broadcasted data streams, a file downloading service DWL for downloading files of different formats, associated delivery procedures ADP, and content streaming services STCD. The services STCD include CODECs (audio, video, voice, text, etc.), and a data stream reception service DSHC implementing the protocol DASH. The service ADP comprises in particular a file repair service FMRP for processing transmission errors in broadcast mode. Below the layer STCD, there are formatting services RTPF for formatting transmission streams, including in particular secured and not secured real time transport services SRTP, RTP, and real time transport control services RTCP. A file repair service FEC located below the formatting service RTPF, is provided to process the transmission errors. A layer HTPC implementing the protocol HTTP is located below the layer DSHC. A layer FLT implementing the protocol FLUTE is located below the layers DSHC, DWL, FMRP and SANN. The layer FLT includes an error correction service FFEC for processing transmission errors. A layer MUDP implementing the protocol UDP (User Datagram Protocol) is located below the layers RTPF (FEC) and FLT. A layer MTC implementing the protocol TCP is located below the layer HTPC. A network layer IPMU implementing the protocol IP in unicast and multicast modes is located below the layers MUDP and MTC. Lastly, an unicast and multicast link layer MTB transmits IP packets generated par the layer IPMU.

Figure 4:
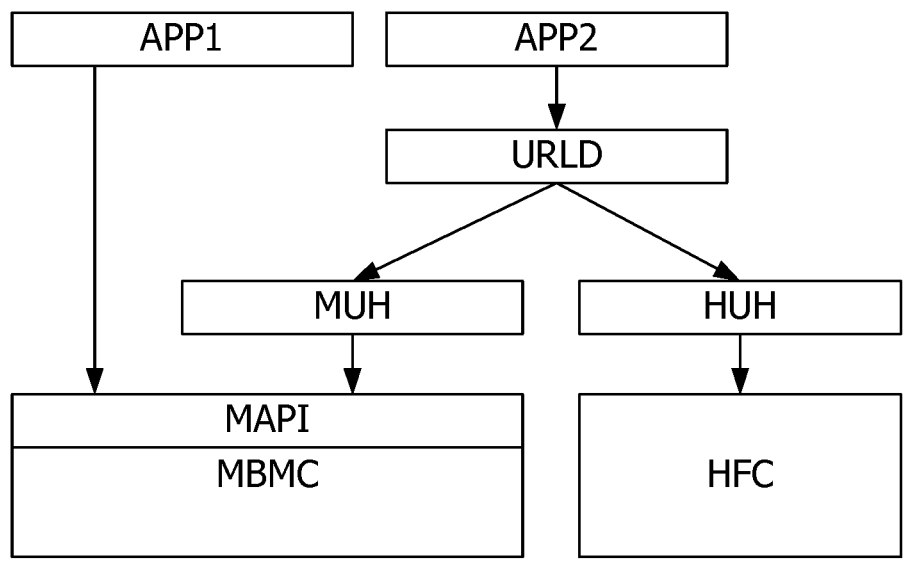
FIG. 4 is a block diagram of a functional architecture within a mobile terminal, according to an embodiment.
Figure 5:
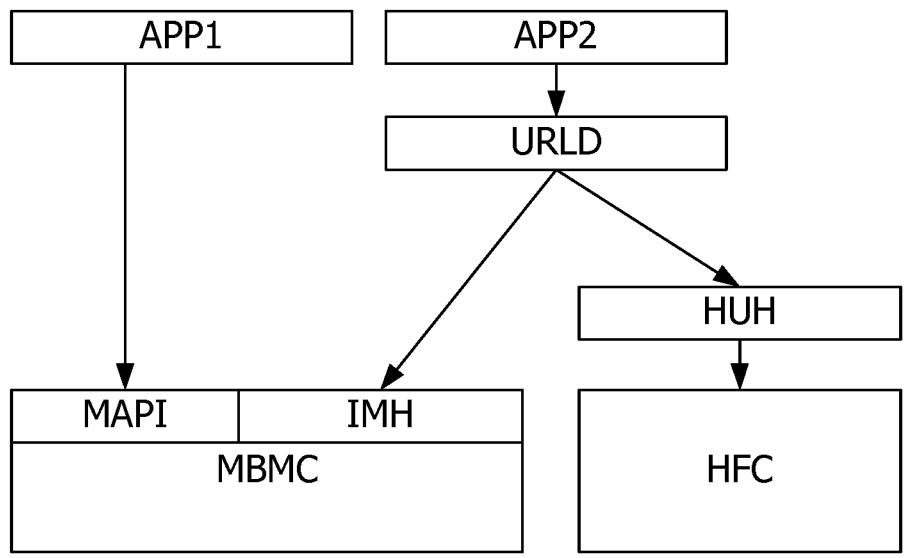
FIG. 5 is a block diagram of a functional architecture within a mobile terminal, according to another embodiment.

FIGS. 4 and 5 illustrate functional different architectures of a user device. In FIG. 4, an application APP1 may be written to use MBMS services using an application programming interface MAPI of the module MBMC. Another application APP2 may be written to support URLs that address 'file' resources, and use a generic operating system URL resolution module URLD to return the identified resource when it encounters one. The "file" resource may be an entry point to a service and it may be the case that there is a default file defined for a service as conventionally done when using the http scheme to access a web site. The URL module URLD identifies the specific protocol handler from the URL scheme name (e.g. "http:" or "mbms:"), and invokes an appropriate protocol-specific handler MUH for mbms scheme, or HUH for http scheme. The interfaces to the handlers MUH, HUH may be also determined by the operating system of the user device UM. The HTTP handler HUH transmits the URL to an HTTP module HF of the operating system. The MBMS handler MUH picks apart the URL form, and, using the existing MBMS interface MAPI, initiates the acquisition of the MBMS service that permits access to the identified resource, and acquisition of the indicated 'file' resource from that session, and returns that resource.

The MBMS URL scheme allows a content provider to construct and transmit to client devices, MBMS URLs of its contents without knowing details on the delivery method that will be used nor the exact scheduling of the content delivery.

FIG. 5 differs from FIG. 4 in that the function performed by the MBMS handler MUH is a function IMH integrated into the module MBMC which directly calls the internal functions of the latter without using the programming interface MAPI.

According to an embodiment, the URLs that can be sent by the applications APP1, APP2 include commands enabling the applications to specify scheduling data to apply to the reception of a requested content, user equipment configuration and location data, content part data or version data to specify a particular content part or version to receive, and request status of a content delivery. The URL syntax is consistent with the specifications RFC 3986 for http URLs, and RFC 7230 and 3GPP TS 26.347 section 8.2 for mbms URLS. the mbms URLs may be defined as follows:

mbms://<authority>/<path>?<parameters>&<label>=<value> where:

<authority>/<path> is a service identifier URI (Unified Resource Identifier),

?<parameters> which is optional, specifies one or more attribute-value pairs separated by "&"; the attributes may be selected in a set of predefined commands.

&<label>=<value> which is optional, specifies a resource identifier of a specific content delivered by the requested service (e.g. a file URI for a single file delivered by a download service, a MPD identifier for a DASH content, a .m3u8 file identifier for a HLS content, or a feed URL for a RSS or Atom feed). If the suffix "&<label=<value>" is not present in an URL, then the prefix mbms://<authority>/<path> provides the resource identifier for the required content and the service identifier is unknown. In that case, a DNS (Domain Name System) resolution for the given MBMS URL may provide an identifier of a service delivering the required content.

The set of commands can be defined in the following table 1:

TABLE 1

| Command Name | Parameter | Single File | VOD | RSS feed |
|---|---|---|---|---|
| Start or Open | Date | X | X | X |
| MaxWaitingPeriod or SetMaxDuration | duration | X | X | X |
| UE capabilities | UE capabilities | | X | X |
| Languages | FR/EN/. . . | | X | X |
| Publication start date | Date | | | X |
| Location | Coordinates | X | X | X |
| From | Percentage | X | X | |
| To | Percentage | X | X | |
| Stop or Discard | None | X | X | x |
| GetStatus | None | X | X | X |
| SetDownloadBackground | Boolean (Yes/no) | | X | X |
| GetNotified | None | | X | X |
| LatestVersion | None | X | | |

Table 1 also indicates for which type of content (single file download, DASH VOD content, HLS VOD content, RSS feed, Atom feed) the command is designed.

The command "Start" or "Open" starts the download or open the service at the date following this command. If no date is specified, it starts download the file or opens the service immediately. This command is the default command if no command is present in the URL.

The command "MaxWaitingPeriod" or "SetMaxDuration" is followed by a duration (for example in seconds). This command specifies an amount of time during which the user device UM can wait for the delivery of the required content. If the duration is omitted, the duration default value could be either null or infinite. If the default duration is null, the action should be immediate. If no service or file is available, a 4xx error (such as 404—no service available) is sent to the user device UM. If the default value is infinite, the module MBMS would retries regularly. In an implementation, the default value can be set to a value that the user device can support in term of battery life. The default value can be defined in a set of parameters defined for the operating system of the user device, for example. According to an example of a podcast content expected to be consumed by the user device in a delay of 2 hours, the user device can fix the "MaxWaitingPeriod" value to 2 hours so that, if the podcast content is broadcasted within this given delay, the content will be locally cached by the device.

The command "UECapabilities" specifies media codecs supported by the user device UM, and the size and resolution of the display of the latter. This command is useful for a DASH/HLS VOD or live stream content available in several representations, for example for user devices compatible with videos in 4K. In this example, UECapabilities may be set equal to "4K" or "HD".

The command "Languages" specifies the languages (voice and subtitles) expected by the user device for the requested service content. This command is useful for a DASH VOD service content available in several languages. The user device capabilities and languages are relevant for RSS/Atom feeds when they are delivering DASH VOD items. This command may be set equal to one code of two letters referring to a country or language, such as "EN", "ES", "DE", "FR", or a list of such codes.

The command "Location" indicates the Current Location of the user equipment. This command is followed by geographical coordinates or a cell number of the user device in a cellular network.

The command "PublicationStartDate" which is specific to Atom and RSS feeds, is followed by a date. This command indicates that the user device waits for delivery of a RSS or Atom feeds that is published after this date.

The command "From" specifies the beginning of a requested portion of the content, when the beginning part of the content is not requested (for example, because the first part of the content has been already cached or viewed). This command is followed by a percentage specifying the beginning of the requested content, the default value being 0%.

The command "to" specifies the end of a requested portion of the content, when the end part of the content is not requested (for example to cache only the beginning of a content). This command is followed by a percentage specifying the end of the requested content, the default value being 100%. The commands "From" and "To" are specific to file download, and DASH and HLS VOD services, and can be used simultaneously in a same URL to specify that only a middle part of a content is requested.

The command "Stop" or "Discard" stops the current content reception and cleans the cache. This command is not followed by a parameter.

The command "GetStatus" requests the current transmission state of the designated content. The different values could be: "Stopped", "102: Processing/InProgress", "404: Unknown service", "201: Downloaded" (in case of a file), and "200: OK/Finished" (in case of DASH or HLS VOD, RTP, and RSS or Atom).

The command "SetDownloadBackground" requires the module MBMC to receive the requested content in background and to store it in cache.

The command "GetNotified" indicates to the module MBMC that the application APP requests to be notified when the requested service is available in broadcast mode. This command is not followed by any parameter. The response to this command is transmitted only when the requested service is available in broadcast mode.

The command "LatestVersion" is used to notify to the module MBMC that only the latest version of the requested content is requested. This command should be used in combination with "Start" or "Open" command and "MaxWaitingPeriod" command. In such a case, the module MBMC is requested to track for the last version of the requested file transmitted from the start time and before the end of the max duration time.

For example, by the following URL:
mbms://www.operator.com/
service1000?start=1477339200
&GetNotified=yes&label=http://www.example.com/
videos/sample.mpd, the application APP requests a DASH content having the MPD URI http://www.example.com/videos/sample.mpd, delivered by the service mbms://www.operator.com/service1000, the content being requested from the time "1477339200", and a notification being requested when the corresponding content will be available.

By the following URL:
mbms://www.operator.com/
service1001&DownloadBackground=yes
&label=http://www.manufacturer.com/firmware/
version10.bin
the application APP specifies that the file "http://www.manufacturer.com/firmware/version10.bin" delivered by the MBMS service "www.operator.com/service1001" is requested and that the file must be downloaded in background.

Response messages to the above commands may use code numbers specified for HTTP, as follows:
1xx for informational responses,
2xx used when the requested operation is successful,
3xx to indicate that the content has been redirected to another location,
4xx introduces an error message from the module MBMC, and
5xx introduced an error message from the module MBMC. Such an error message is transmitted to the application APP, for instance, when local caches or a local HTTP server function in the module MBMC does not fulfil a valid request. All these messages transmitted by the module MBMC to the application APP.

For example:
"202 Accepted" is issued when the request has been accepted for processing, but processing of the request is not currently completed.
"308" is issued by the module MBMC when for instance a requested file will never be transmitted by the server BMS, to specify a permanent redirection to a file (as specified in RFC 7538.
"404" is issued when the requested resource cannot be currently found, but may be available in the future.
"400 Bad Request" is issued when the module MBMC cannot or will not process the request, because it cannot be understood due to malformed syntax.
"503 Service Unavailable" issued when the module MBMC is currently unavailable, e.g. overloaded or down for maintenance). This message generally signals a temporary state.

Figure 6:
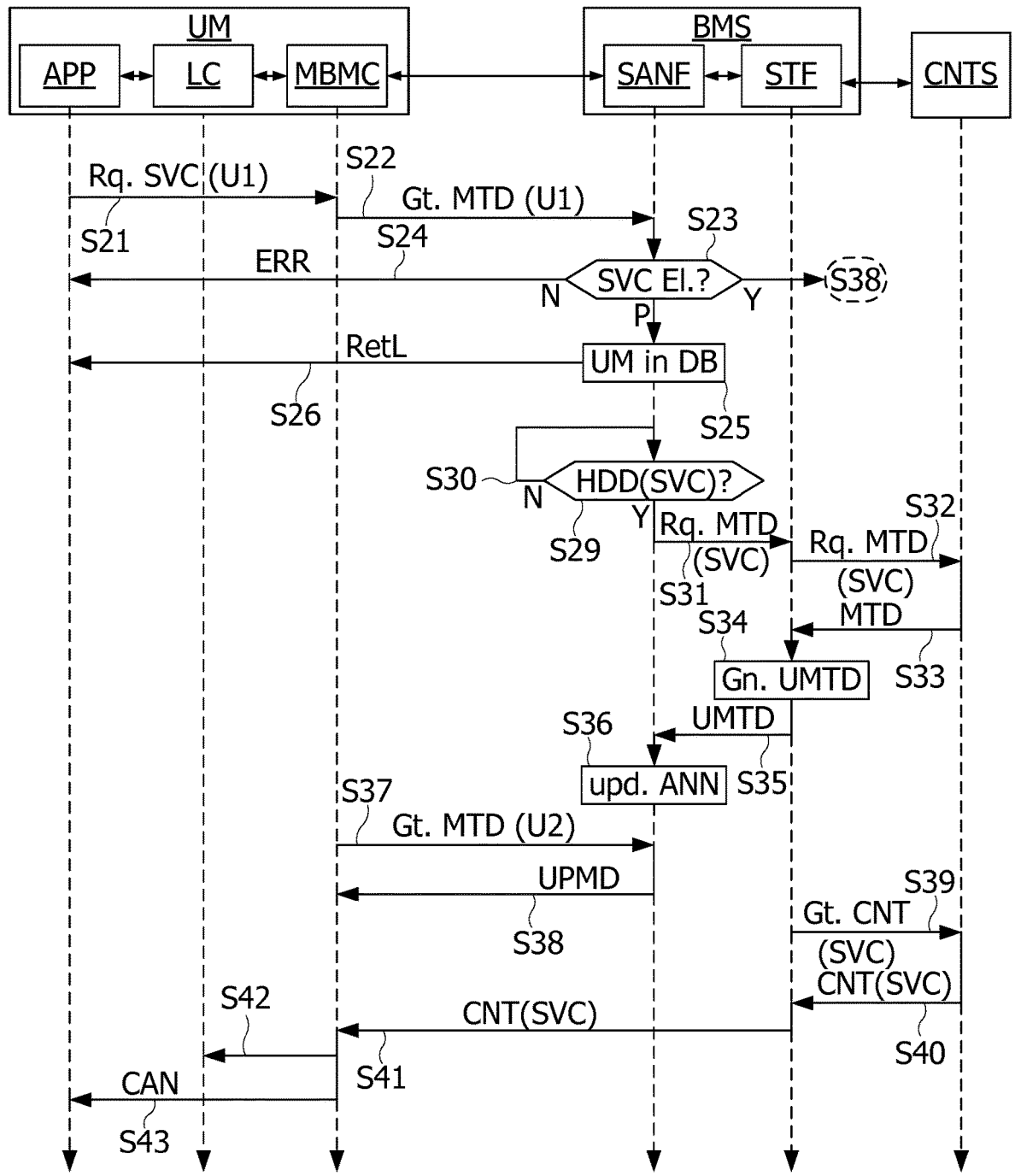
FIG. 6 is a sequential diagram showing steps providing access of a user terminal to broadcasted content, according to an embodiment.

FIG. 6 illustrates steps S21 to S43 which can be performed to enable a user terminal UM to access a service providing media contents or a file downloading service, according to an embodiment. The targeted service may give access to a data stream transmitted in real time, or in delayed time, such as a file to download or a content (multimedia, audio, video) accessible by streaming or by a DASH or HLS service. The content can be a file or a set of files. The content can be also an RSS feed (e.g. RSS 2.0) or an Atom feed. In step S21, an application APP transmits an access request to query a service SVC providing a particular content. The request contains an URL U1 identifying the requested service, and one or more of the commands such as commands as previously defined. According to an example, the URL U1 includes the scheme "mbms" and possibly the command "MaxWaitingPeriod" or "SetMaxDuration" associated with a duration, and other commands such as those specifying the capabilities ("UECapabilities") of the user device UM, the location ("Location") of the user device, and preferred languages ("Languages") requested by the user. The URL U1 indicates that the application APP requests the service SVC and is ready to wait the duration associated with the command "MaxWaitingPeriod" for a delivery of the corresponding content over broadcast. The URL U1 is processed by the module URLD which identifies from the URL scheme name the specific protocol handler MUH, HUH that can process the URL. As including the scheme "mbms", the module URLD transmits the URL U1 to the handler MUH which calls the entry functions (API) of the module MBMC corresponding to the content of the URL U1. This way, the module MBMC is requested to determine if the requested content is already in cache, and to store the duration that the application APP can wait for receiving the requested content. If the requested content is already in cache (if appropriate, while taking into account the commands "UECapabilities" and "Languages"), steps S42 and S43 are performed, otherwise step S22 is performed. The requested content may be already in cache when a previously transmitted URL U1 of the service contained the command "Download Background".

In step S22, the module MBMC transmits a request for metadata MTD including the URL U1 to the server BMS. In step S23, the announcement function SANF of the server BMS receives this request and looks for a service identifier of the service SVC in a service list of services excluded from the broadcast mode and in a database MB including service metadata of currently broadcasted contents or contents that can be later broadcasted by the server BMS. If the suffix "&<label>=<value>" is not present in the URL U1, then the function SANF uses a DNS resolving function to determine a service identifier (service URI) that may deliver the content identified by the prefix mbms://<authority>/<path> of the URL U1. The duration associated with the command "MaxWaitingPeriod" and the location associated with the command "Location" can be considered when the server BMS queries the database MB. Several services providing a same content can be activated to support user mobile devices with different features for accessing the content, each service providing the content in a manner adapted to the capabilities of one given type of user device. Therefore, the server BMS can check in step S23 whether the requested service SVC is available for the terminal UM when considering the capabilities of the terminal UM and preferred language data given in the URL U1.

Step S24 can be performed if the requested service SVC is excluded from the broadcast mode or if it is not available according to the capabilities of the terminal specified by the command "UECapabilities", or if is not available during a time slot specified by the command "MaxWaitingPeriod", and/or in the region of the network MNT specified by the command "Location". Steps S25 to S26 or S38 are performed if the service corresponding to the service identifier SVC is not excluded from the broadcast mode. In step S24, and error message ERR is transmitted to the application APP executed by the user device UM.

If the service corresponding to the service identifier SVC can be broadcasted, but is not referenced in the database MB, steps S25 to S26 are performed, otherwise step S38 is performed. In step S25, the server BMS (for example the announcement function SANF of the server BMS) stores in the database MB that the user terminal UM is requested the service SVC. In step S26, the server BMS transmits to the user terminal UM a response message RetL signaling that the requested service SVC is not available in broadcast mode at the moment, but can be so later, for example when a sufficient number of user devices request the same service SVC. The message RetL can include a length of time the terminal UM waits before it can reissue the service request of step S21. The message RetL can be first received by the module MBMC of the user terminal UM, and transmitted to the application APP. Then the user of the terminal UM can decide to wait for the availability of the service SVC in broadcast mode, or decide to request the service SVC in unicast mode. The application APP may also send a new URL requesting to be notified when the service SVC will be available (command "GetNotified").

When steps S21 to S26 are performed, the server BMS counts (step S25) the service requests received from the user devices (in step S22) and performed steps S29 to S38. Specifically, the function SANF counts the number of user terminals requesting access to a same service taking into account localization data (in the received data MURI). In step S29, the server BMC determines if a given service is requested by a sufficient number of user terminals to justify broadcasting the content corresponding to the service. For this purpose, the function SANF of the server BMS compares the counted number of terminal with a threshold value. In step S30, as long as the number of user terminals UM requesting a same service does not exceed the threshold value in a zone of the network MNT, step S29 is performed again, otherwise steps S31 to S38 are performed.

In step S31, the function SANF of the server BMS transmits a request for metadata MTD related to the service SVC which will be broadcasted. In step S32, the metadata request is transmitted by a function STF of the server BMS to the content CNTS which provides the service SVC. In step S32, the server BMS can also request initialization segments of the service SVC when the service is VOD streaming. In step S33, the content server CNTS receives the metadata request and transmits to the server BMS a response message containing the requested metadata MTD(SVC) for the service SVC. In step S34, the function STF of the server BMS receives the metadata and generates unified metadata UMTD from the received metadata MTD. For this purpose, the server BMS schedules one or more time slots during which the content will be broadcasted. The unified metadata UMTD are derived from the received metadata MTD by adding to them a URL address where the broadcasted service can be received, and information related to time slots when the corresponding content will be broadcasted. The unified metadata UMTD are stored in the database MB. The server can check from the received metadata MTD the size of the content provided by the service. In step S35, the unified metadata UMTD are transmitted to the function SANF of the server BMS. If the requested service SVC is a file downloading service, the server BMS can itself generate the metadata of the service.

In step S36, the function SANF updates the database MB containing the metadata for accessing the service that can be broadcasted, by storing in it the received unified metadata UMTD and received initialization segments. When step S36 is performed, the function STF transmits to the content server CNTS a content request CNT for the content provided by the service SVC (step S39). In step S40, the server CNTS transmits the requested content CNT(SVC) to the server BMS. The server BMS locally stores the content CNT to make it available for the user terminals UM located in a service zone of the server BMS in the mobile network MNT.

In step S37 which is the same as step S22, the module MBMC requests the metadata MTD of the service SVC again. This step can be performed after S26, after a waiting time specified in the message RetL, or when the module MBMC receives a response to a previously transmitted URL containing the command "GetNotified". In step S38 which follows step S37, the unified metadata UMTD are available in the database MB managed by the function SANF, and are transmitted from the server BMS to the module MBMC of the user terminal UM, in response to the request transmitted in step S37 (or S22). Thus the terminal UM can use the metadata MTD including in particular an URL to access the broadcasted service SVC, as soon as the latter will be available in this mode in steps S41. In step S42, the content CNT(SVC) is stored in a cache memory LC of the terminal UM. In step S43, the application APP executed by the user terminal UM is notified by the module MBMC that the content CNT(SVC) is currently broadcasted and available to the application APP.

A file downloading service may concern several files that may be updated from time to time. In this context, the request transmitted by the application APP in step S21 may concern one occurrence of one of these files (e.g. the last occurrence), or one occurrence of all these files (e.g. the last occurrence), or all occurrences of one or all files.

It can be observed that the service SVC can be broadcasted before the scheduled time slot specified in the message RetL (transmitted in step S26). In this latter case, if the terminal UM already receives the content provided by the service SVC in unicast, it can then switch to the broadcasted content in a classical manner, seamless viewed from the user. At the time announced in the metadata MTD when the content provided by the service SVC is broadcasted, the application APP can also trigger itself to access the broadcasted content.

The present disclosure and the illustrations are to be considered as illustrative rather than restrictive, and the appended claims are intended to cover all such modifications, enhancements and other embodiments, or combinations thereof, which fall within the true spirit and scope of the description. Therefore, the scope of the following claims is to be determined by the broadest permissible interpretation of the claims and their equivalents, and shall not be restricted or limited by the foregoing description.

In particular, the present disclosure is not limited to the above list of commands. Other commands can be easily imagined while remaining in the scope of the accompanying claims. The possible commands can be classified into categories such as those specifying scheduling or temporal conditions, those specifying technical conditions related the user terminal capabilities, those specifying conditions defined by the user (such as "Languages"), and those requesting further information related to the delivery of the service specified by the <authority> and <path> fields of the URL.

What is claimed is:

1. A method for accessing a service delivering content from a user terminal, the method comprising:
    selecting, by an application of the user terminal, at least one command from a predefined command set including a plurality of commands controlling delivery of a requested content to the user terminal, each command of the command set including zero or more parameters, the command set including a command specifying a scheduling or temporal condition related to access to a requested content by the user terminal;
    generating, by the application, a Uniform Resource Locator (URL) including an identifier of the requested content and the at least one command;
    transmitting, by the application, the URL to a client module of the user terminal;
    in response to the requested content being available to the client module in the user terminal and consistent with the at least one command, receiving the requested content from the client module; and
    in response to the requested content not being available to the client module in the user terminal and when the at least one command includes the command specifying the scheduling or temporal condition related to access to the requested content:
        transmitting the URL to a service broadcasting server, and
        one of:
            receiving the requested content at a time consistent with the scheduling or temporal condition, when the requested content is available to the broadcasting server at the time consistent with the scheduling or temporal condition,
            receiving a message indicating that the requested content will be available at a specified date, when the requested content will be available to the broadcasting server at a time different from the scheduling or temporal condition, or
            receiving a message indicating that the requested content will not be broadcasted, when the requested content will never be available to the broadcasting server according to the at least one command.

2. The method of claim 1, wherein:
    the URL includes a scheme specifying, as a service type, a multimedia broadcast or multicast service or a hypertext transfer protocol service, and
    the method further comprises transmitting the URL to a URL handler of the user terminal specific to the scheme.

3. The method of claim 1, wherein the at least one command includes a command specifying a technical condition related capabilities of the user terminal, or a user condition defined by a user related to the requested content.

4. The method of claim 1, wherein the at least one command includes a request for a current status of the delivery of the requested content.

5. The method of claim 1, wherein the command set further includes at least one of:
    a command including a parameter specifying a start time from which the requested content is requested, the start time being a time of reception of the URL by the broadcasting server when no time is specified,
    a command including a parameter specifying a period during which the requested content is requested,
    a command including a parameter specifying media codecs and a display size of the user terminal,
    a command including a parameter specifying a location of the user terminal,
    a command including a parameter specifying preferred languages for the requested content,
    a command including a parameter specifying a content publication date from which the requested content is requested,
    a command including a parameter specifying a beginning and an end of a requested part of the requested content, a command for stopping or cancelling access to the requested content, a command for requesting a delivery status of the requested content, a command for specifying that the requested content must be transmitted in a background by the user terminal, a command for requesting to receive a notification when or indicating when the requested content is ready for being broadcasted, and a command for requesting a last version of the requested content available within a period starting from a time specified by the command specifying a start time and having a duration defined by the command specifying a period during which the requested content is requested.

6. The method of claim 1, further comprising receiving, from the service broadcasting server, a notification that the requested content will be broadcasted at a specified date.

7. The method of claim 1, further comprising:

receiving, by the service broadcasting server, requests from a plurality of user terminals including the user terminal, counting, by the service broadcasting server, a number of user terminals of the plurality of user terminals requesting the requested content in a network area, and when the number of user terminals requesting the requested content exceeds a threshold value, scheduling broadcasting of the requested content.

8. The method of claim 7, further comprising notifying, to the number of user terminals requesting the requested content, schedule data related to broadcasting of the requested content.

9. The method of claim 1, further comprising:

a domain name system resolution to identify a service when the URL does not include a service identifier.

10. The method of claim 1, further comprising transmitting the URL to the broadcasting server subsequent to receiving the message indicating the date when the content will be available.

11. A user terminal configured to access a service delivering content, the user terminal comprising a processor configured to:

select, by an application of the user terminal, at least one command from a predefined command set including a plurality of commands controlling delivery of a requested content to the user terminal, each command of the command set including zero or more parameters, the command set including a command specifying a scheduling or temporal condition related to access to a requested content by the user terminal;

generate, by the application, a Uniform Resource Locator (URL) including an identifier of the requested content and the at least one command;

transmit, by the application, the URL to a client module of the user terminal;

receive the requested content from the client module in response to the requested content being available to the client module in the user terminal and consistent with the at least one command; and in response to the requested content not being available to the client module in the user terminal and when the at least one command includes the command specifying the scheduling or temporal condition related to access to the requested content:

transmit the URL to the service broadcasting server, and one of:

receiving the requested content at a time consistent with the scheduling or temporal condition, when the requested content is available to the broadcasting server at the time consistent with the scheduling or temporal condition, receiving a message indicating that the requested content will be available at a specified date, when the requested content will be available to the broadcasting server at a time different from the scheduling or temporal condition, or receiving a message indicating that the requested content will not be broadcasted, when the requested content will never be available to the broadcasting server according to the at least one command.

12. The user terminal of claim 11, wherein:

the URL includes a scheme specifying, as a service type, a multimedia broadcast or multicast service or a hypertext transfer protocol service, and the processor is further configured to transmit the URL to a URL handler in the user terminal, the URL handler being specific to the scheme.

13. The user terminal of claim 11, wherein the at least one command includes a command satisfying a technical condition related capabilities of the user terminal, or a user condition defined by a user related to the requested content.

14. The user terminal of claim 11, wherein the at least one command includes a request for a current status of the delivery of the requested content.

15. The user terminal of claim 11, wherein the command set further includes at least one of:

a command including a parameter specifying a start time from which the requested content is requested, the start time being a time of reception of the URL by the broadcasting server when no time is specified, a command including a parameter specifying a period during which the requested content is requested, a command including a parameter specifying media codecs and a display size of the user terminal, a command including a parameter specifying a location of the user terminal, a command including a parameter specifying preferred languages for the requested content, a command including a parameter specifying a content publication date from which the requested content is requested, a command including a parameter specifying a beginning and an end of a requested part of the requested content, a command for stopping or cancelling access to the requested content, a command for requesting a delivery status of the requested content, a command for specifying that the requested content must be transmitted in a background by the user terminal, a command for requesting to receive a notification when or indicating when the requested content is ready for being broadcasted, and a command for requesting a last version of the requested content available within a period starting from a time specified by the command specifying a start time and having a duration defined by the command specifying a period during which the requested content is requested.

16. The user terminal of claim 11, wherein the processor is further configured to receive, from the service broadcasting server, a message that the requested content will be broadcasted at a specified date.

17. A non-transitory computer readable storage medium storing instructions that when carried out by one or more computers, cause the one or more computers to perform the method of claim 1.

* * * * *